(12) United States Patent
Kobayashi et al.

(10) Patent No.: US 11,873,992 B2
(45) Date of Patent: Jan. 16, 2024

(54) COMBUSTOR LINER

(71) Applicant: KAWASAKI JUKOGYO KABUSHIKI KAISHA, Kobe (JP)

(72) Inventors: Masayoshi Kobayashi, Akashi (JP); Takeo Oda, Akashi (JP); Takeo Nishiura, Akashi (JP); Tomoko Tsuru, Akashi (JP); Takaya Hamamoto, Akashi (JP); Takeshi Takagi, Akashi (JP); Osamu Hisamatsu, Akashi (JP); Hirotaka Kurashima, Akashi (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 18/070,039

(22) Filed: Nov. 28, 2022

(65) Prior Publication Data

US 2023/0093427 A1  Mar. 23, 2023

Related U.S. Application Data

(60) Division of application No. 16/407,821, filed on May 9, 2019, now Pat. No. 11,543,132, which is a continuation of application No. PCT/JP2016/083501, filed on Nov. 11, 2016.

(51) Int. Cl.
*F23R 3/00* (2006.01)
*F23R 3/10* (2006.01)
*F23R 3/60* (2006.01)

(52) U.S. Cl.
CPC .............. *F23R 3/002* (2013.01); *F23R 3/007* (2013.01); *F23R 3/10* (2013.01); *F23R 3/60* (2013.01)

(58) Field of Classification Search
CPC .................................. F23R 3/007; F23R 3/60
See application file for complete search history.

(56) References Cited

U.S. PATENT DOCUMENTS

| 6,938,424 | B2 | 9/2005 | Tiemann |
| 7,779,637 | B2 | 8/2010 | Heilos |
| 2003/0145604 | A1* | 8/2003 | Pidcock .................. F23R 3/002 60/752 |

(Continued)

FOREIGN PATENT DOCUMENTS

| EP | 0943867 A1 | 9/1999 |
| EP | 1533574 A1 | 5/2005 |

(Continued)

*Primary Examiner* — Katheryn A Malatek
*Assistant Examiner* — Alyson Joan Harrington
(74) *Attorney, Agent, or Firm* — Sughrue Mion, PLLC (57) ABSTRACT

A combustor liner used for a gas turbine combustor and forming a combustion chamber includes: an outer side wall made of metal; a panel attached to an inner side of the outer side wall and made of a ceramic matrix composite material, the panel including a panel body facing the combustion chamber, and a connection piece rising from an exterior surface of the panel body at a side portion of the panel body and protruding in a lateral direction; and a connection unit configured to connect the panel to the outer side wall, the connection unit including an elastic member configured to bias at least one of the outer side wall and the connection piece, and a fixation member made of metal and configured to fix at least one of the connection piece and the elastic member to the outer side wall.

2 Claims, 6 Drawing Sheets

(56) References Cited

U.S. PATENT DOCUMENTS

| | | |
|---|---|---|
| 2004/0074239 A1 | 4/2004 | Tiemann |
| 2006/0176671 A1 | 8/2006 | Heilos |
| 2006/0255549 A1 | 11/2006 | Amos et al. |
| 2010/0077764 A1 | 4/2010 | Dierberger |
| 2010/0307162 A1 | 12/2010 | Bottcher et al. |
| 2014/0360196 A1 | 12/2014 | Graves et al. |
| 2015/0322806 A1 | 11/2015 | Twelves et al. |
| 2015/0362192 A1 | 12/2015 | Cunha et al. |
| 2016/0047549 A1 | 2/2016 | Landwehr et al. |
| 2016/0131362 A1 | 5/2016 | Vogtmann et al. |
| 2016/0186997 A1* | 6/2016 | Sadil ............ F02C 7/16 411/347 |
| 2016/0186999 A1* | 6/2016 | Freeman ......... F23R 3/007 29/889.22 |
| 2016/0201910 A1 | 7/2016 | Chang et al. |
| 2016/0290145 A1 | 10/2016 | Roussille et al. |

FOREIGN PATENT DOCUMENTS

| | | |
|---|---|---|
| EP | 1 555 443 A1 | 7/2005 |
| EP | 1884713 A1 | 2/2008 |
| JP | 2004-144466 A | 5/2004 |
| JP | 2006-220409 A | 8/2006 |
| WO | 2015009384 A1 | 1/2015 |

\* cited by examiner

COMBUSTOR LINER

CROSS REFERENCE TO THE RELATED APPLICATION

This application is a Divisional of U.S. application Ser. No. 16/407,821, filed May 9, 2019, which is a continuation application, under 35 U.S.C. § 111(a), of international application No. PCT/JP2016/083501, filed Nov. 11, 2016, the disclosure of which is incorporated by reference in their entirety into this application.

BACKGROUND OF THE INVENTION

Field of the Invention

The present invention relates to a combustor liner used for a gas turbine combustor.

Description of Related Art

As a combustor liner used for a gas turbine combustor, there is known a combustor liner having a double structure including an inner side wall (hot side) and an outer side wall (cold side). For example, Patent Document 1 proposes that the inner side wall is formed from a plurality of panels, and opposed surfaces of the outer side wall and the panels are provided with a plurality of hooks so that the hooks are engaged with each other.

Meanwhile, in recent years, it has been proposed that, instead of conventional metal materials, a ceramic matrix composite material (hereinafter, may be referred to as "CMC material") which is a light material having high heat resistance is used for a constituent component, such as a combustor liner, of a gas turbine engine used for an aircraft or the like.

RELATED DOCUMENT

Patent Document

[Patent Document 1] JP Laid-open Patent Publication No. 2004-144466

SUMMARY OF THE INVENTION

In the case of using a CMC material for a combustor liner, as in Patent Document 1, it is conceivable that the panel is formed from the CMC material. However, in this case, what structure should be used for supporting the panel with respect to the outer side wall is a problem. Under a high-temperature environment such as a combustor, the thermal expansion difference due to the difference in linear expansion coefficient between a metal material and the CMC material becomes remarkable, and therefore it is difficult to support the panel with a conventional simple fastening structure. In addition, in the case of using a structure in which hooks are merely engaged as disclosed in Patent Document 1, it is difficult to reliably support the panel with respect to the outer side wall. In the first place, in the case of forming the panel from a CMC material, it is difficult to form a protrusion like the hook at the center of the inner side wall because of the nature of the material.

In order to solve the above problem, an object of the present invention is to provide a combustor liner that enables a panel to be reliably supported to an outer side wall while forming the panel by a CMC material.

In order to attain the above object, a combustor liner according to the present invention is a combustor liner used for a gas turbine combustor and forming a combustion chamber, including: an outer side wall made of metal; a panel attached to an inner side of the outer side wall and made of a ceramic matrix composite material, the panel including a panel body facing the combustion chamber, and a connection piece rising from an exterior surface of the panel body at a side portion of the panel body and protruding in a lateral direction; and a connection unit configured to connect the panel to the outer side wall, the connection unit including an elastic member configured to bias at least one of the outer side wall and the connection, and a fixation member made of metal and configured to fix at least one of the connection piece and the elastic member to the outer side wall. As a specific configuration, a plurality of the panels may be arranged such that end surfaces of the connection pieces of the adjacent panels are opposed to each other, thereby forming an inner side wall attached to the inner side of the outer side wall.

In this configuration, at the side portion of each panel to which a protrusion can be easily formed with continuous fibers using a CMC material, the connection piece rising from the panel body so as to be distant from the panel body is provided, and the connection piece is connected to the outer side wall, whereby the members placed at the connection portion are separated from the high-temperature combustion chamber by the panel body. Thus, it becomes possible to attach the panel to the outer side wall, using the connection unit including the fixation member made of metal. Therefore, it is possible to reliably connect the panel to the outer side wall. Further, by using the elastic member as well as the fixation member, it is possible to absorb the thermal expansion difference between the fixation member made of metal and the panel made of a CMC material. Therefore, it becomes possible to reliably support the panel to the outer side wall while achieving heat-resistance improvement and weight reduction of the combustor liner by applying the CMC material.

In one embodiment of the present invention, the end surface of each connection piece may be positioned on an inner side with respect to a side surface of the panel body. In this configuration, the panel body widely covers the combustion chamber side of the fixation member and the elastic member composing the connection unit, whereby it is ensured that the connection unit is separated from the high-temperature combustion chamber.

In one embodiment of the present invention, the combustion liner may include a main air passage formed in a space between two connection pieces of each panel, and a connection portion air passage formed between the connection pieces of the adjacent panels, and the main air passage and the connection portion air passage may be partitioned from each other by the connection pieces. In this configuration, the fixation member and the elastic member made of metal, which are highly needed to be cooled and which are present in the connection portion air passage, can be selectively cooled. Thus, it becomes possible to perform efficient cooling.

In one embodiment of the present invention, a gap may be formed between the end surfaces of the adjacent two connection pieces, and an area of the outer side wall that is opposed to the gap may be formed with an air introduction hole configured to introduce air into the connection portion air passage from outside of the outer side wall. This configuration enables cooling air to be introduced into the connection portion air passage, with use of a simple configuration.

In one embodiment of the present invention, the connection pieces of the plurality of panels may protrude in a circumferential direction. In this configuration, by an air passage formed between the connection pieces, cooling air is guided so as to flow from the upstream side toward the downstream side of the combustor, whereby it is possible to efficiently cool the entire combustor liner.

In one embodiment of the present invention, the outer side wall may be formed with a bolt insertion hole, the connection wall may be formed with a bolt insertion opening, the fixation member may include a bolt inserted from a connection piece side to an outer side wall side, and a nut screwed to the bolt, and the bolt may include a head portion provided with a plate-shaped member made of metal. This configuration enables reliable connection using a bolt and a nut that are easily available in general as the fixation member. In addition, by providing a metallic plate-shaped member to the head portion of the bolt, the tightening force to the outer side wall made of a CMC material is relaxed, whereby the panel can be stably supported over a long term.

In one embodiment of the present invention, the bolt may be a stepped bolt including a large diameter portion that is able to be inserted into the bolt insertion opening and is unable to be inserted into the bolt insertion hole, the plate-shaped member may be a plate spring serving as the elastic member, and the nut may be screwed to the bolt in a state in which the large diameter portion is in contact with a peripheral edge of the bolt insertion hole of the outer side wall, so that the connection piece is pressed against the outer side wall by the plate spring, whereby the connection piece is connected to the outer side wall. In this configuration, owing to the large diameter portion of the bolt, a strong tightening force from the fixation member acts on the outer side wall. Therefore, it is possible to connect the panel to the outer side wall by a pressing force of the plate spring which is the elastic member, without directly applying the strong tightening force from the fixation member to the panel made of a CMC material. Thus, while increase in the dimension in the connection direction between the outer side wall and the panel is suppressed and the thermal expansion difference between the fixation member made of metal and the panel made of a CMC material is absorbed, the panel can be stably supported over a long term.

In one embodiment of the present invention, a ring-shaped spring serving as the elastic member may be interposed between the outer side wall and the nut. In this configuration, the elastic member serving also as a washer is interposed also between the nut and the outer side wall, whereby the thermal expansion difference between the fixation member made of metal and the panel made of a CMC material can be absorbed more reliably.

In one embodiment of the present invention, the adjacent two panels may be attached to the outer side wall by a common connection unit. In this configuration, the number of the connection units is decreased, whereby increase in weight and cost can be suppressed.

In one embodiment of the present invention, the fixation member of the common connection unit may be placed in a gap formed between the adjacent two connection pieces. In this configuration, the number of the connection units is decreased with use of a simple and compact structure, whereby increase in weight and cost can be suppressed.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
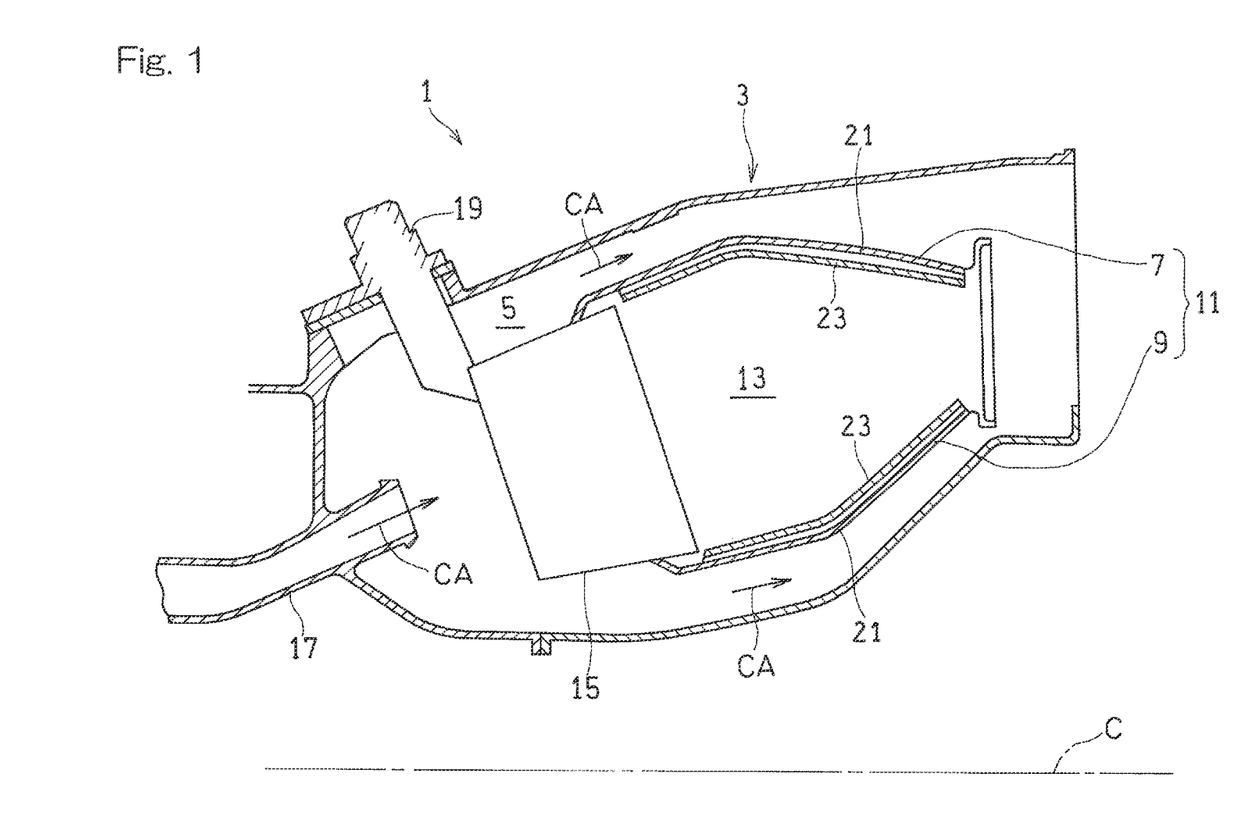
FIG. 1 is a sectional view showing a combustor liner according to the first embodiment of the present invention.

Hereinafter, embodiments of the present invention will be described with reference to the drawings. FIG. 1 shows a combustor 1 in which a combustor liner according to the first embodiment of the present invention is used. In FIG. 1, the line C represents a center line. The combustor 1 is used for a gas turbine engine, and the combustor 1 5 mixes fuel with compressed air supplied from a compressor of a gas turbine engine and combusts the resultant mixture, and sends the high-temperature and high-pressure combusted gas generated by the combustion, to a turbine, thereby driving the turbine. The gas turbine engine may be, for example, a gas turbine engine used for an aircraft.

The combustor 1 is of an annular type combustor. The combustor 1 includes a combustor housing 3 provided on the outer side. Inside the combustor housing 3, an annular internal space 5 is formed. In the internal space 5 of the combustor housing 3, a combustor liner 11 is disposed. The combustor liner 11 includes an annular outer liner 7 and an annular inner liner 9 in which the annular inner liner 9 is disposed on the inner side of the annular outer liner 7 concentrically with the annular outer liner 7. An annular combustion chamber 13 is formed inside the combustor liner 11. At the top wall of the combustor liner 11, a plurality of fuel injection units 15 for injecting fuel into the combustion chamber 13 are arranged in the circumferential direction. In this specification, when terms "circumferential direction", "axial direction", and "radial direction" are simply mentioned, unless otherwise described, they respectively refer to the "circumferential direction", the "axial direction", and the "radial direction" of the combustor liner 11.

Compressed air CA supplied from the compressor is introduced through an annular diffuser passage 17 into the annular internal space 5 in the combustor housing 3. The introduced compressed air CA is supplied to the fuel injection unit 15. In addition, the compressed air CA is used as air for cooling the combustor liner 11 as described later. From a fuel pipe unit 19 supported by the combustor housing 3, fuel is supplied to the fuel injection unit 15. It is noted that the type of the combustor 1 is not limited to the annular type, but may be any other type, e.g., a can type.

Hereinafter, the structure of the combustor liner 11 will be described in detail. Although the following description is focused mainly on the structure of the outer liner 7 as a representative, but unless specifically described, the inner liner 9 may have the same structure as the outer liner 7.

The combustor liner 11 has a double-wall structure including an outer side wall 21 facing the internal space 5 of the combustor housing 3, and an inner side wall 23 facing the combustion chamber 13. The outer side wall 21 (which is, in this drawing which shows the outer liner, an outer circumferential wall) of the combustor liner 11 is made of metal. On the other hand, the inner side wall 23 (which is, in this drawing which shows the outer liner, an inner circumferential wall) of the combustor liner 11 is made of a ceramic matrix composite material. It is noted that, in the case of the inner liner 9, the outer side wall of the combustor liner 11 corresponds to an inner circumferential wall, and the inner side wall thereof corresponds to an outer circumferential wall. The CMC material forming the inner side wall 23 in the present embodiment is, for example, SiC-fiber-reinforced SiC material or SiC-coated carbon-fiber-reinforced carbon material, and has a heat resistance temperature of about 1000° C. to 2000° C.

Figure 2:
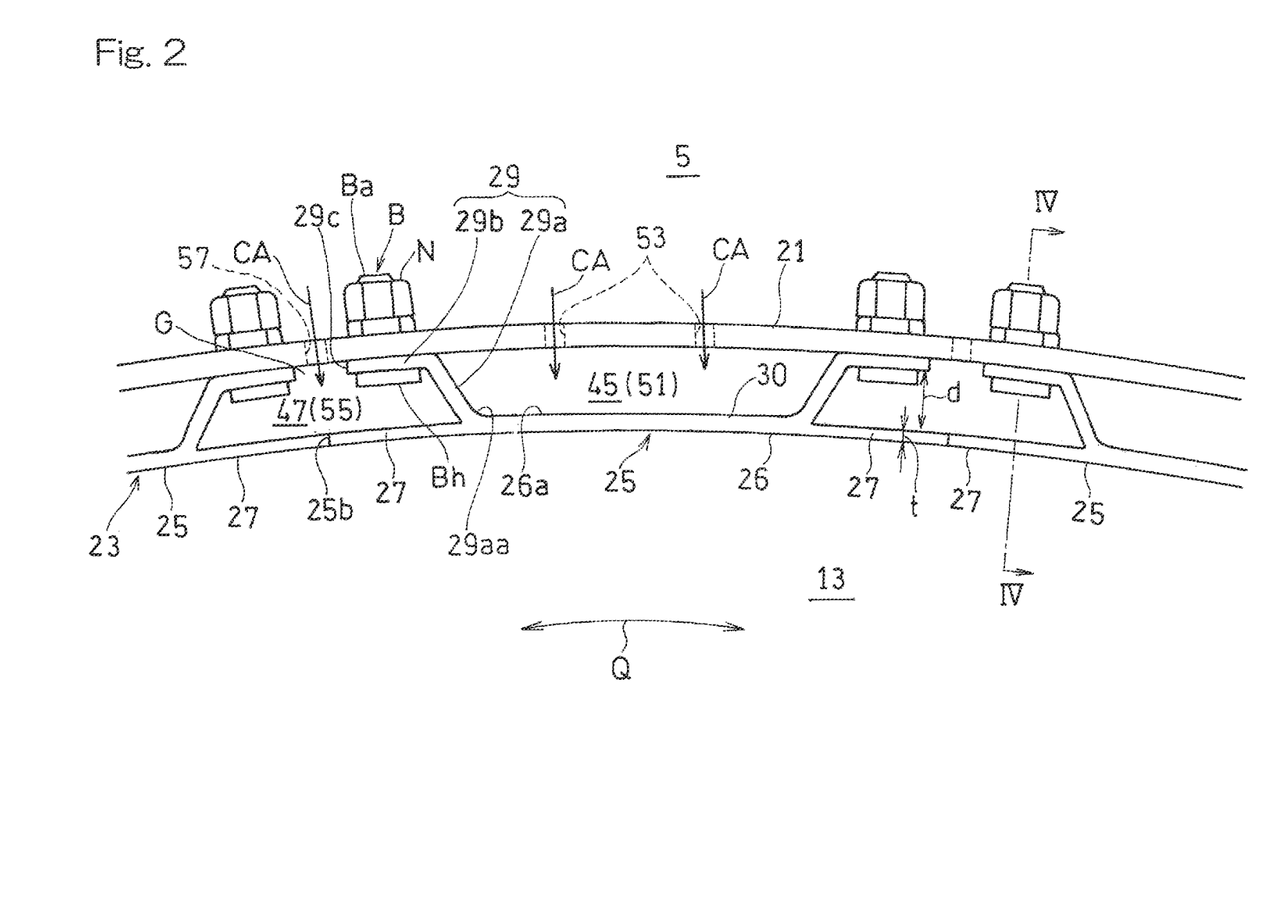
FIG. 2 is a front view showing a part of the combustor liner shown in FIG. 1.
Figure 3:
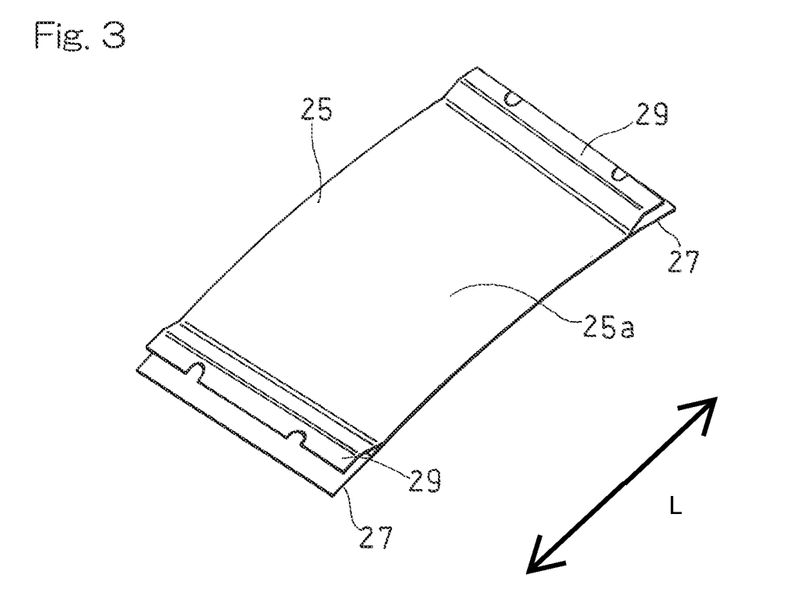
FIG. 3 is a perspective view showing a panel in the combustor liner shown in FIG. 2.

As shown in FIG. 2, the inner side wall 23 is formed from a plurality of panels 25 which are divided elements of the inner side wall 23. Therefore, the panels 25 are also made of the CMC material. In the present embodiment, the inner side wall 23 is formed from a plurality of the panels 25 which are divided elements obtained by dividing the inner side wall 23 in the axial direction and the circumferential direction. The plurality of panels 25 are each attached on the inner side which is the combustion chamber 13 side of the outer side wall 21. The plurality of panels 25 are arranged so as to cover the outer side wall 21 from the combustion chamber 13 side. Each panel 25 has a shape substantially along the shape of the opposed area of the outer side wall 21. Thus, the inner side wall 23 has, as a whole, a shape substantially along the outer side wall 21. In the present embodiment, the plurality of the panels 25 are arranged in the axial direction and the circumferential direction so as to cover the outer side wall 21 overall. Thus, the outer side wall 21 is protected from high-temperature gas in the combustion chamber 13. As shown in FIG. 3, each panel 25 is formed in a rectangular shape in a plan view.

As shown in FIG. 2, the panel 25 includes a panel body 26 and a connection piece 29. The panel body 26 forms a portion that faces the combustion chamber 13. In addition, the panel body 26 is formed substantially in a planar shape as a whole. In addition, the panel bodies 26 are arranged along the opposed areas of the outer side wall 21. In the present embodiment, each panel body 26 is formed in an arc shape parallel to the outer side wall 21. The connection piece 29 forms a portion connected with the outer side wall 21. At a side portion of the panel 25, the connection piece 29 is provided so as to rise from an exterior side surface 26a of the panel body 26 and protrude in the lateral direction of the panel 25. The connection piece 29 is continuously provided in a direction along one nearby side-line of the panel 25 (in FIG. 2, the depth direction of the drawing plane). The exterior surface 26a is a surface of the panel 25 that is opposed to the outer side wall 21. In this specification and drawings (e.g., as shown in FIG. 3), the "lateral direction" L is defined as a direction from a rising portion 29aa of the connection piece 29 toward one nearby side-line of the panel 25. In the following description, of the side portion of the panel 25, a side portion where the connection piece 29 is provided (a portion in the lateral direction from the rising portion 29aa of the connection piece 29) is referred to as a connection portion 27. In the present embodiment, of the four side portions of the rectangular panel 25, two side portions corresponding to one pair of opposed side-lines are formed as the connection portions 27.

Each connection piece 29 may not extend in perfectly parallel to one nearby side-line of the panel 25. Preferably, the connection piece 29 extends continuously over the entire length of one nearby side-line of the panel 25. As a matter of course, the connection piece 29 may not be formed so as to perfectly continuously extend over the entire length of one nearby side-line of the panel 25.

The connection piece 29 includes a base portion 29a and an end portion 29b. The base portion 29a rises so as to branch from the panel body 26. The end portion 29b is connected to the distal end of the base portion 29a, and is spaced from the panel body 26. In addition, the end portion 29b extends along the opposed area of the outer side wall 21. In the shown example, an end surface (end surface that faces in the protruding direction of the connection piece 29) 29c of the connection piece 29 is positioned on the inner side (center side of the panel 25) with respect to a side surface 25b of the panel body 26. That is, the panel body 26 is positioned so as to cover the combustion chamber 13 side of the connection piece 29.

The connection piece 29 is also made of a CMC material. The connection piece 29 and the panel body 26 are formed as a one-piece element so that fibers of the CMC material are continuously formed thereinside. In this way, the panel body 26 and the connection piece 29 are strongly connected with each other. It is noted that, in the panel body 26, in the case where an area toward the center side from the rising position of each connection piece 29 is defined as a center portion 30, it is preferable that the thickness of the connection piece 29 is ⅓ to ½ of the thickness of the center portion 30. By forming the connection piece 29 with such a thickness, the connection piece 29 can be branched from the panel body 26 while the strength of the connection piece 29 is maintained appropriately.

The rising angle of the base portion 29a of the connection piece 29 is not particularly limited. Preferably, the base portion 29a of the connection piece 20 rises so as to be inclined with respect to the radial direction as shown in the drawing. That is, preferably, the rising portion 29aa from the panel body 26 of the base portion 29a rises smoothly in the lateral direction from the center portion of the panel 25 so as to be continuously formed. Thus, continuity of the fibers in the rising portion 29aa can be further ensured. In the present embodiment, as an attachment structure for the panel 25, a protrusion corresponding to the connection piece 29 is not provided to the outer side wall 21. Therefore, it is possible to suppress increase in the radial-direction dimension of the combustor liner 11.

Each connection piece 29 is connected to the outer side wall 21 by a connection unit CU. Thus, each panel 25 is attached to the outer side wall 21. The connection unit CU includes an elastic member 33 for biasing at least one of the outer side wall 21 and the connection piece 29. In the present embodiment, the elastic member 33 is made of metal. In addition, in the shown example, the connection unit CU includes a fixation member 31 made of metal. As described above, the panel body 26 is positioned so as to cover the combustion chamber 13 side of the connection piece 29, and thus the panel body 26 also covers the combustion chamber 13 side relative to the fixation member 31 and the elastic member 33 which form the connection unit CU. Therefore, it is ensured that the connection unit CU is separated from the high-temperature combustion chamber 13.

Figure 4:
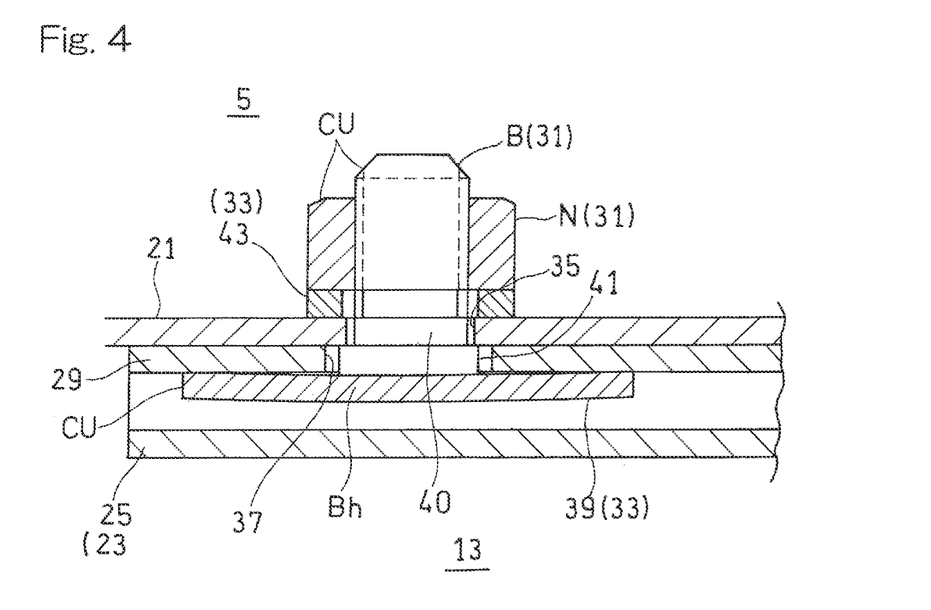
FIG. 4 is a sectional view along IV-IV line in FIG. 2.

In the present embodiment, as shown in FIG. 4, the fixation member 31 includes a bolt B including a screw member, and a nut N to be screwed with the bolt B. The bolt B is inserted from the connection piece 29 side to the outer side wall 21 side. That is, a head portion Bh of the bolt B is located so as to confront the combustion chamber 13 side of the connection piece 29. The outer side wall 21 is formed with a bolt insertion hole 35 for inserting the bolt B. The connection piece 29 is formed with a bolt insertion opening 37 for inserting the bolt B. In detail, the bolt insertion opening 37 is formed on the end surface 29c of the connection piece 29. In the present embodiment, the bolt insertion opening 37 is formed as a cutout. The bolt insertion opening 37 may be another form of opening, e.g., a hole, that allows the bolt to be inserted therethrough. For both of the bolt insertion hole 35 and the bolt insertion opening 37 in the form of a hole, the hole shapes are not particularly limited, but may be, for example, a circular hole, or an elongated hole (including a slit).

The head portion Bh of the bolt B is provided with a plate spring 39 (a plate-shaped member made of metal), which is the elastic member 33 having a plate shape. In the present embodiment, the head portion Bh of the bolt B is provided with a rectangular plate spring 39. In this example, the plate spring 39 is provided integrally with the head portion Bh by means of welding. As a matter of course, the structure for providing the plate spring 39 to the head portion Bh is not limited to this example as long as the plate spring 39 can be fixed to the head portion Bh without loss of elasticity of the plate spring 39. For example, the bolt B and the plate spring 39 may be formed by integral molding, or the plate spring 39 formed separately from the bolt B may be fixed by being inserted into a fixation groove provided in the head portion Bh.

In the shown example, the hole diameter (the width in sectional view) of the bolt insertion hole 35 of the outer side wall 21 is smaller than the width of the bolt insertion opening 37 of the connection piece 29. The bolt B is formed as a stepped bolt including at least a small diameter portion 40 and a large diameter portion 41. The bolt B has the large diameter portion 41 on the head portion Bh side. The small diameter portion 40 is formed on a side, with respect to the large diameter portion 41, opposite to the head portion Bh. The outer diameters (the widths in sectional view) of the small diameter portion 40 and the large diameter portion 41 are both smaller than the width of the bolt insertion opening 37. In addition, the outer diameter of the small diameter portion 40 is smaller than the width of the bolt insertion hole 35. On the other hand, the outer diameter of the large diameter portion 41 is greater than the width of the bolt insertion hole 35. That is, the large diameter portion 41 can be inserted into the bolt insertion opening 37 but cannot be inserted into the bolt insertion hole 35. The small diameter portion 40 can be inserted into both of the bolt insertion hole 35 and the bolt insertion opening 37. Therefore, when the bolt B is inserted into the bolt insertion opening 37 and the bolt insertion hole from the connection piece 29 side, an end surface of the large diameter portion 41 comes into contact with the peripheral edge of the bolt insertion hole 35 of the outer side wall 21. In this state, the nut N is screwed to the bolt B from the outer side wall 21 side. Thus, the connection piece 29 is biased by the plate spring 39 and pressed against the outer side wall 21, whereby the connection piece 29 is connected to the outer side wall 21. A ring-shaped spring 43 which is the elastic member 33 is interposed between the nut N and the outer side wall 21.

In this way, in the present embodiment, with the fixation member 31, the plate spring 39 which is the elastic member 33 is fixed to the outer side wall 21 and supported thereto. In other words, the fixation member 31 in the present embodiment functions as a support member for supporting the plate spring 39 with respect to the outer side wall 21. The elastic member 33 thus supported presses the connection piece 29 to the outer side wall 21, whereby the connection piece 29 is connected to the outer side wall 21.

By using the bolt B and the nut N as the fixation member 31 composing the connection unit CU as described above, it is possible to make reliable connection using a member that is easily available in general as the fixation member 31. In addition, by providing a plate-shaped metallic member (in the present embodiment, plate spring 39) to the head portion Bh of the bolt B, the tightening force to the panel 25 made of a CMC material is relaxed, whereby the inner side wall 23 can be stably supported over a long term. It is noted that the fixation member 31 is not limited to the bolt B and the nut N, but any fixation member may be used. Specifically, as in the bolt B, it is possible to suitably use a member, such as a rivet, that includes a shaft portion that can penetrate through the outer side wall 21 and the connection piece 29 in the radial direction, and a head portion which has a larger diameter than the shaft portion and is provided at an end portion of the shaft-shaped part, and to which the elastic member 33 can be attached additionally or in a replacing manner. As a matter of course, in the case of using the bolt B and the nut N, the fixation member 31 can be easily detached and thus exchange and maintenance for the combustor liner are facilitated.

Here, the names "bolt insertion hole" and "bolt insertion opening" are merely used for referring to a hole and an opening through which the fixation member is inserted in the case of using the bolt B and the nut N as an example of the fixation member 31. Therefore, in the case of using another member as the fixation member 31 as described above, the names are replaced as appropriate in accordance with the name of the other member.

Figure 5:
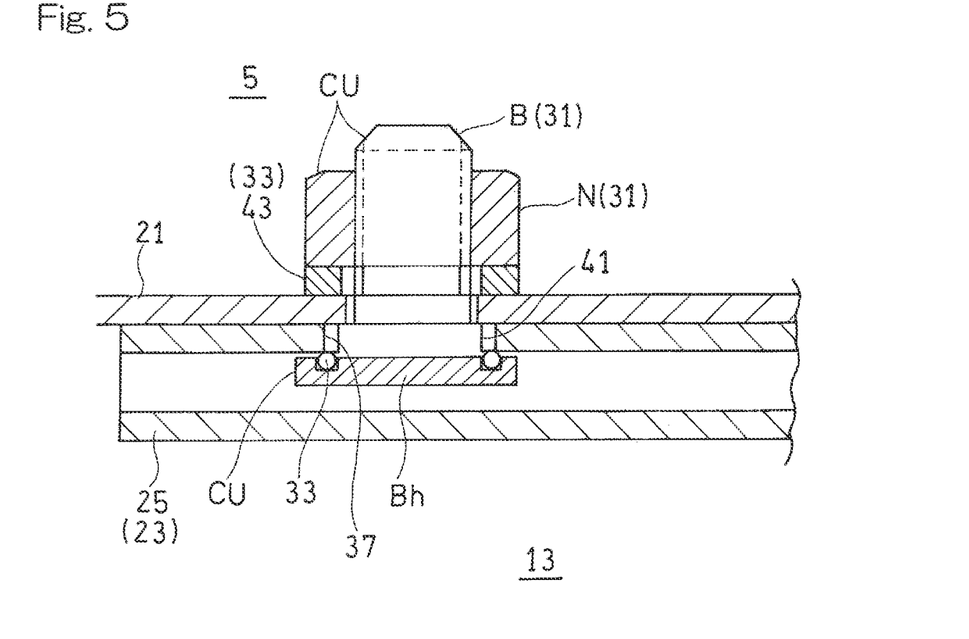
FIG. 5 is a sectional view showing a modification of the embodiment shown in FIG. 2.

Also, owing to the large diameter portion 41 of the bolt B, a strong tightening force from the fixation member 31 acts on the outer side wall. Therefore, it is possible to connect the panel 25 to the outer side wall 21 by a pressing force of the plate spring 39 which is the elastic member 33, without directly applying the strong tightening force from the fixation member to the panel 25 made of a CMC material. Thus, while increase in dimensions in the connection direction (i.e., radial direction) between the outer side wall 21 and the panel 25 is suppressed and the thermal expansion difference between the fixation member 31 made of metal and the panel 25 made of a CMC material is absorbed, the panel 25 can be stably supported over a long term. It is noted that, other than the plate spring 39, any elastic member 33 that has elasticity in such a direction as to press the connection piece 29 to the outer side wall 21 may be provided to the head portion Bh of the bolt B. For example, as shown in FIG. 5, the head portion Bh of the bolt B may be formed from a normal metal material, and a ring-shaped elastic member 33 such as a coil spring or a C ring may be interposed between the head portion Bh and the connection piece 29.

By interposing the ring-shaped spring 43, which is the elastic member 33 serving also as a washer, between the nut N and the outer side wall 21, the thermal expansion difference between the fixation member 31 made of metal and the panel 25 made of a CMC material can be absorbed more reliably. As the ring-shaped spring 43 in the present embodiment, any member that has elasticity in the tightening direction of the nut N with respect to the outer side wall 21 may be used. For example, a spring washer, a disc spring, or the like may be used. In the present embodiment, since the thermal expansion difference can be absorbed using the plate spring 39, a normal washer other than an elastic member may be used instead of the ring-shaped spring 43.

In the present embodiment, two connection pieces 29 of each panel 25 are provided so as to rise from the exterior surface 26a of the panel body 26. In addition, each connection piece 29 is continuously formed along one nearby side-line of the panel 25. Thus, a recessed portion formed from the base portions 29a of the two connection pieces 29 and the center portion 30 of the panel body 26 is defined between a pair of opposed side-lines of each panel 25. A plurality of the panels 25 formed as described above are arranged such that the side surfaces 25b of the panels 25 abut on each other. In addition, the end portions 29b of the connection pieces 29 branching from a pair of side portions of each panel 25 are connected to the outer side wall 21. Thus, the connection pieces 29 extend so as to cross the space between the outer side wall 21 and the panel body 26. Thus, the space between the outer side wall 21 and the panel bodies 26 of the panels 25 arranged such that the side surfaces 25b abut on each other is partitioned into a plurality of spaces by the connection pieces 29. That is, as shown in FIG. 2, by the connection pieces 29, the space between the panel bodies 26 and the outer side wall 21 is partitioned into a space (hereinafter, referred to as a "main space 45") between both connection pieces 29 of each single panel 25 and a space (hereinafter, referred to as a "connection portion space 47") between two connection pieces 29, 29 of the adjacent panels 25. In the shown example, the head portion Bh of the bolt B is located in the connection portion space 47 and most part of a shaft portion Ba of the bolt B and the nut N are located in the internal space 5 on the outer side of the outer side wall 21. That is, the head portion Bh of the bolt B is covered by the panel body 26 so that the head portion Bh is not directly exposed to high-temperature gas in the combustion chamber 13.

Figure 6:
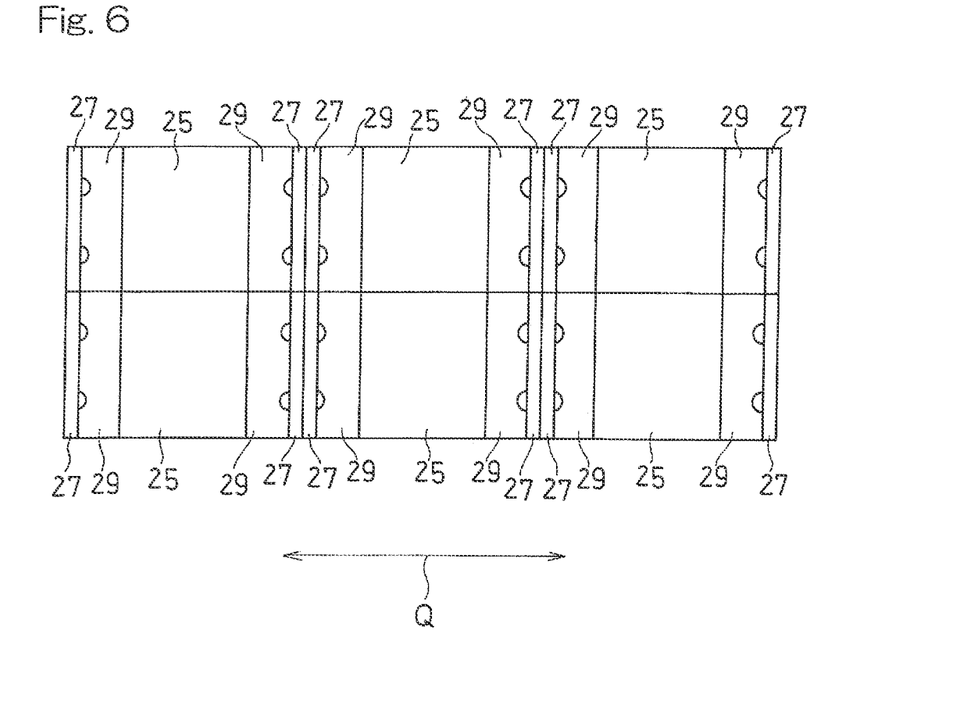
FIG. 6 is a plan view schematically showing the arrangement of the panels in the embodiment shown in FIG. 2.

As shown in FIG. 2, the plurality of panels 25 are arranged such that the end surfaces 29c, 29c of the connection pieces 29, 29 of the adjacent panels 25 are opposed to each other. Further, as shown in FIG. 6, the plurality of panels 25 are arranged such that, of the four side-lines of the rectangular shape, side portions corresponding to two side-lines at which the connection portions 27 are formed are in contact with each other and side portions corresponding to the other two side-lines are in contact with each other. Thus, the main spaces 45 formed between both connection pieces 29, 29 of each single panel 25 in FIG. 2 are connected with each other to form a main air passage 51 which is a passage for air flowing through the center portion of each panel 25. The outer side wall 21 is formed with an air introduction hole for introducing air into the main air passage 51. In the shown example, a first air introduction hole 53 is provided in an area of the outer side wall 21 that is opposed to the main air passage 51 (i.e., an area that faces the main air passage 51 and covers the main air passage 51). Through the first air introduction hole 53, the compressed air CA in the internal space 5 is introduced as cooling air into the main air passage 51. In this way, the inner side wall 23 made of CMC is cooled.

On the other hand, the connection portion spaces 47 formed between the adjacent connection pieces 29, 29 are connected with each other to form a connection portion air passage 55 which is a passage for air flowing through the connection portion 27. The outer side wall 21 is formed with an air introduction hole for introducing air into the connection portion air passage 55. In the shown example, as described above, the end surface 29c of each connection piece 29 is positioned on the inner side with respect to the side surface 25b of the panel 25, and therefore, a gap G is formed between the connection pieces 29, 29 of the adjacent panels 25. The gap G may be used as an intake port for introducing the cooling air into the connection portion air passage 55. In this example, a second air introduction hole 57 is provided in an area of the outer side wall 21 that is opposed to the gap G (i.e., an area that faces the gap G and covers the gap G). Through the second air introduction hole 57, the compressed air CA is introduced as cooling air into the connection portion air passage 55. That is, merely by providing the second air introduction hole 57 in the outer side wall 21 made of metal, it becomes possible to cause the compressed air CA to flow as cooling air into the connection portion air passage 55. In this way, the fixation member 31 and the elastic member 33 which are made of metal and disposed in the connection portion space 47 are cooled.

In particular, the fixation member 31 and the elastic member 33 which are support members made of metal are lower in heat resistance as compared to the CMC material, and therefore are highly needed to be cooled. Therefore, in the present embodiment, the connection portion air passage 55 is separated from the main air passage 51 by the connection pieces 29, and by, for example, adjusting the amounts of air to flow into both air passages, it becomes possible to selectively and effectively cool the fixation member 31 and the elastic member 33 made of metal, which are disposed in the connection portion space 47. In the shown example, in particular, the passage area of the connection portion air passage 55 is smaller than the passage area of the main air passage 51. Thus, the fixation member 31 and the elastic member 33 made of metal which are disposed in the connection portion space 47 can be more effectively cooled.

Preferably, the width (length in the protruding direction) of each connection piece 29 may be a width that is substantially necessary and sufficient for placing the members composing the connection unit CU. Specifically, it is preferable that the width of the connection piece 29 is in a range of 1.1 to 1.2 times the maximum width of the members composing the connection unit CU (the maximum length in the protruding direction of the end portion 29b of the connection piece 29). With such a configuration, it is possible to reduce the passage area of the connection portion air passage 55 while ensuring the dimensions for the connection piece 29 and the connection portion 27 that are necessary for connecting the panel 25 to the outer side wall 21 by the connection unit CU.

Preferably, the distance between the connection portion 27 of the panel body 26 and the end portion 29b of the connection piece 29, i.e., a radial-direction dimension d of the connection portion air passage 55 is in a range of 1.5 to 3 times a thickness t of the connection portion 27 of the panel body 26. With such a structure, the space for separating the connection unit CU from the combustion chamber 13 (panel body 26) is ensured, while the structure can be compact in the radial direction.

In the present embodiment, the connection portion space 47 forming the connection portion air passage 55 and the main space 45 are completely partitioned from each other by means of the connection piece 29 that continuously extends in the direction along one nearby side-line of the panel 25 over the entire length of the one side-line, whereby the connection portion space 47 does not communicate with the main space 45. However, the connection piece 29 may have a hole or a cutout as long as cooling air flow in the connection portion air passage 55 is not substantially disturbed. The passage area of the connection portion air passage 55 may not necessarily be smaller than the passage area of the main air passage 51.

In the present embodiment, the plurality of panels 25 are arranged such that the connection portions 27 are directed in the circumferential direction Q. In this example, the connection piece 29 of each panel 25 protrudes in the circumferential direction Q. Accordingly, the connection pieces 29 of the plurality of panels 25 are contiguous to each other along the axial direction. In this case, the main air passage 51 and the connection portion air passage 55 guide the compressed air CA for cooling so that the air flows from the upstream side toward the downstream side of the combustor. Thus, the entire combustor liner 11 can be efficiently cooled. As a matter of course, the arrangement direction of the plurality of panels 25 is not limited to the above example. For example, the plurality of panels 25 may be arranged such that the connection portions 27 are directed in the axial direction. In other words, the connection pieces 29 of the plurality of panels 25 may be contiguous to each other in the circumferential direction. In this case, the main air passage 51 and the connection portion air passage 55 guide the compressed air CA for cooling so that the air flows in the circumferential direction of the combustor.

In the combustor liner 11 according to the present embodiment as described above, at the side portion of each panel 25, at which a protrusion with continuous fibers can be easily formed using a CMC material, the connection piece 29 rising from the panel body 26, that is, spaced from the panel body 26 is provided, and the connection piece 29 is connected to the outer side wall 21. Thus the members placed at the connection portion 27 are separated from the high-temperature combustion chamber 13 by the panel body 26. In particular, in the case of arranging the plurality of panels 25 side by side, the members placed at the connection portions 27 are not directly exposed to high-temperature gas in the combustion chamber 13. In addition, since the connection piece 29 of each panel 25 is a protrusion formed with continuous fibers using the CMC material, the connection piece 29 has a sufficient strength also for strong connection. Thus, it becomes possible to attach the panel 25 to the outer side wall 21, using the connection unit CU including the fixation member 31 made of metal. Further, since the connection unit CU made of metal, specifically, the fixation member 31 such as a bolt, can be used, strong connection can be achieved with a minimum necessary number of protrusions such as hooks provided to connection target objects. Therefore, it is possible to reliably connect the panel 25 to the outer side wall 21 while suppressing increase in the dimension in the radial direction of the combustor liner 11.

Further, by using the elastic member 33 as well as the fixation member 31, it is possible to absorb the thermal expansion difference between the fixation member 31 made of metal and the panel 25 made of a CMC material. Therefore, it becomes possible to reliably support the panel 25 to the outer side wall 21 while achieving heat-resistance improvement and weight reduction of the combustor liner 11 by applying the CMC material.

In the present embodiment, an example in which the panel 25 is rectangular in a plan view has been shown. However, the shape of the panel 25 is not limited hereto, but may be a trapezoid or a triangle, for example. As a matter of course, forming each panel 25 in a rectangular shape makes it easy to arrange the plurality of panels 25 with no gaps therebetween.

In the present embodiment, the case where the outer side wall 21, the fixation member 31 and the elastic member 33 composing the connection unit CU, and the plate-shaped member are metallic members, has been described. However, regarding the material forming these members, if metal is contained as a main component, another material may be contained as long as the natures and the functions of these members as described above are not lost. For example, the surface of each member may be coated with a material other than metal, or a material other than metal may be inserted inside each member. Similarly, regarding the material forming the panel 25, if a CMC material is contained as a main component, another material may be contained as long as the natures and the functions of the panel 25 as described above are not lost. For example, the surface of the panel 25 may be coated with a material other than CMC, or a material other than CMC may be inserted inside each member.

Figure 7:
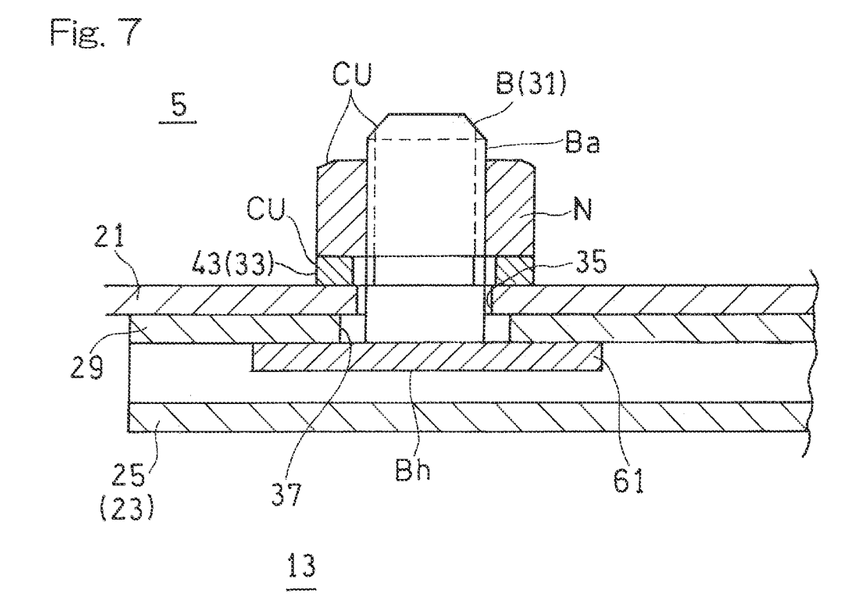
FIG. 7 is a sectional view showing a part of a combustor liner according to the second embodiment of the present invention.

FIG. 7 shows the second embodiment of the present invention. In the present embodiment, the structure for attaching the panel 25 to the outer side wall 21 is different from that in the first embodiment. Therefore, the difference will be mainly described, while description of the same configurations as those in the first embodiment is omitted.

In the present embodiment, a shaft portion Ba of the bolt B which is the fixation member 31 and includes a screw member is formed as a shaft portion that does not have a large diameter portion that is in contact with the outer side wall 21. At the head portion Bh of the bolt B, a normal metal plate 61 which is not an elastic member is provided as the plate-shaped member made of metal. The ring-shaped spring 43 which is the elastic member 33 is interposed between the nut N and the outer side wall 21. That is, in the present embodiment, the connection piece 29 is fixed to the outer side wall 21 by the fixation member 31. In other words, the fixation member 31 in the present embodiment functions as a fastening member for fastening the connection piece 29 and the outer side wall 21 with each other. In addition, the outer side wall 21 is biased by the elastic member 33 and pressed against the connection piece 29. In the present embodiment, the hole diameter of the bolt insertion hole 35 and the width of the bolt insertion opening 37 may be equal to each other.

Figure 8:
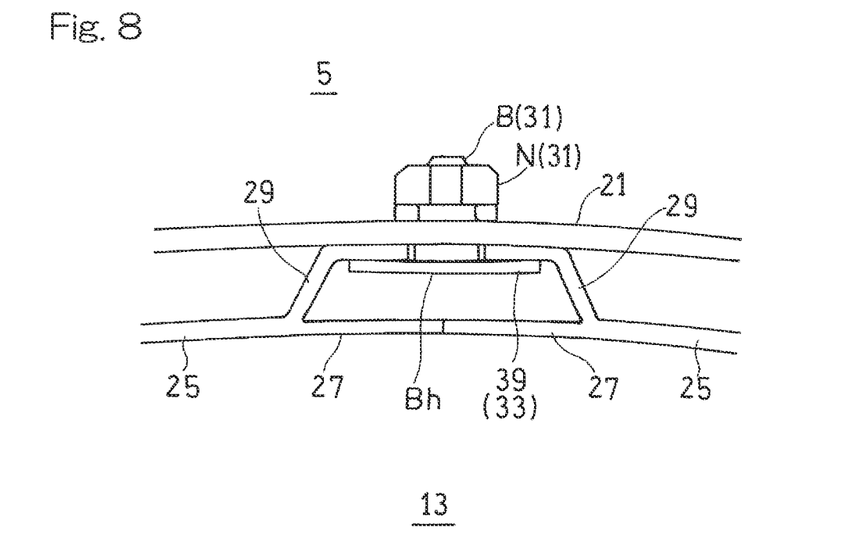
FIG. 8 is a sectional view showing a part of a combustor liner according to the third embodiment of the present invention.

FIG. 8 shows the third embodiment of the present invention. In the present embodiment, the structure for attaching the panel 25 to the outer side wall 21 is different from that in the first embodiment. Therefore, the difference will be mainly described, while description of the same configurations as those in the first embodiment is omitted. As shown in FIG. 8, in the present embodiment, two panels 25, 25 adjacent to each other are attached to the outer side wall 21 by the common connection unit CU. That is, the fixation member 31 and the elastic member 33 are shared between the adjacent panels 25. Thus, the numbers of the fixation members 31 and the elastic members 33 are reduced, whereby increase in weight and cost can be suppressed. Preferably, the fixation member 31 is provided at the gap G between the connection pieces 29, 29 of the adjacent panels 25. That is, preferably, in the outer side wall 21, a hole through which the fixation member 31 is inserted is formed in an area that is opposed to the gap G Thus, it is possible to easily provide the fixation member 31.

Figure 9:
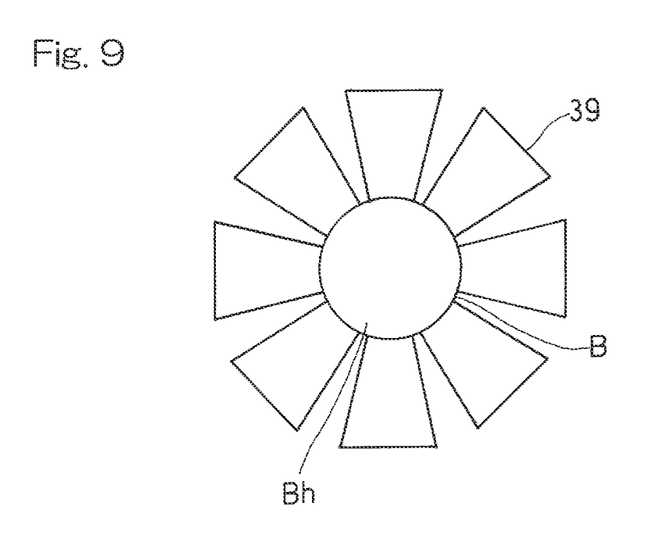
FIG. 9 is a plan view schematically showing an example of an elastic member in the embodiment shown in FIG. 8.

In the present embodiment, as shown in FIG. 9, the head portion Bh of the bolt B is provided with a petal-shaped plate spring 39, i.e., a plate spring 39 having a plurality of plate spring pieces protruding radially around the head portion Bh of the bolt B. By using the petal-shaped plate spring 39 as described above, stress applied to the connection piece 29 made of a CMC material is further dispersed and relaxed as compared to the case of the rectangular plate spring 39. In addition, at the time of tightening work for the bolt B, it is not necessary to adjust the circumferential-direction position of the plate spring 39, and thus the tightening work is facilitated.

Also in the present embodiment, the rectangular plate spring 39 may be used as in the first embodiment. In addition, as shown in FIG. 5, the head portion Bh of the bolt B may be formed from a normal metal material, and the elastic member 33 such as a coil spring or a C ring may be interposed between the head portion Bh and the connection piece 29. Further, also in the present embodiment, as in the second embodiment, only the ring-shaped spring 43 interposed between the nut N and the outer side wall 21 may be used as the elastic member 33, and the normal metal plate 61 which is not the elastic member 33 may be provided to the head portion Bh of the bolt B.

The petal-shaped plate spring 39 used in the third embodiment may be used also in the first embodiment as long as the petal-shaped plate spring 39 has such a size as not to interfere with the plate spring 39 of the adjacent bolt B. Further, the metal plate in the second embodiment may be formed in a petal shape.

Also in the second embodiment and the third embodiment described above, as in the first embodiment, the connection piece 29 rising from the panel so as to be distant from the panel 25 is provided at the side portion of the panel 25 made of a CMC material, and the connection piece 29 is connected to the outer side wall 21, whereby the member placed at the connection portion 27 is not directly exposed to high-temperature gas in the combustion chamber 13. Thus, it becomes possible to attach the panel 25 to the outer side wall 21, using the connection unit CU including the fixation member 31 made of a metal material. Therefore, it is possible to reliably connect the panel 25 to the outer side wall 21 while suppressing increase in the dimension of the combustor liner 11. Further, by using the elastic member 33 as well as the fixation member 31, it is possible to absorb the thermal expansion difference between the fixation member 31 made of metal and the panel 25 made of a CMC material. Therefore, it becomes possible to reliably support the panel 25 to the outer side wall 21 while achieving heat-resistance improvement and weight reduction of the combustor liner 11 by applying the CMC material.

Although the present invention has been described above in connection with the embodiments with reference to the accompanying drawings, numerous additions, changes, or deletions can be made without departing from the gist of the present invention. Accordingly, such additions, changes, or deletions are to be construed as included in the scope of the present invention.

REFERENCE NUMERALS

1 Combustor
11 Combustor liner
13 Combustion chamber
21 Outer side wall
23 Inner side wall
25 Panel
26 Panel body
27 Connection portion
29 Connection piece
31 Fixation member
33 Elastic member
35 Bolt insertion hole
37 Bolt insertion opening
39 Plate spring (plate-shaped member)
51 Main air passage
Connection portion air passage
61 Metal plate (plate-shaped member)
CU Connection unit
B Bolt (fixation member)
N Nut (fixation member)

What is claimed is:

1. A combustor liner configured for use in a gas turbine combustor and forming a combustion chamber, the combustor liner comprising:
   an outer side wall made of metal;
   a plurality of panels, each panel being attached to an inner side of the outer side wall and made of a ceramic matrix composite material, each panel including
      a panel body having an interior surface facing the combustion chamber,
      a first connection piece and a second connection piece each rising from an exterior surface of the panel body facing the inner side of the outer side wall, the first connection piece rising at a first side portion of the panel body and protruding in a lateral direction to a first end surface, the second connection piece rising at a second side of the panel body and protruding in an opposite lateral direction to a second end surface, and
      a first connection portion extending in the lateral direction from the first side portion of the panel body to a first portion end surface, a second connection portion extending in the opposite lateral direction from the second side portion of the panel body to a second portion end surface; and
   a plurality of connection units, each connection unit configured to connect a pair of adjacent panels of the plurality of the panels to the outer side wall, wherein the pair of adjacent panels of the plurality of panels are arranged such that the respective first end surface of the respective first connection piece of one panel of the pair of adjacent panels is opposed to the respective second end surface of the respective second connection piece of the other panel of the pair of adjacent panels, and the respective first portion end surface of the respective first connection portion of the one panel of the pair of adjacent panels is opposed to and in contact with the respective second portion end surface of the respective second connection portion of the other panel of the pair of adjacent panels, thereby forming an inner side wall attached to the inner side of the outer side wall, and
   wherein each connection unit includes a respective elastic member configured to maintain contact of both the respective first connection piece of the one panel of the pair of adjacent panels and the respective second connection piece of the other panel of the pair of adjacent panels with the outer side wall, and a respective fixation member made of metal and configured to fix at least one of the respective elastic member and both the respective first connection piece of the one panel of the pair of adjacent panels and the respective second connection piece of the other panel of the pair of adjacent panels to the outer side wall.

2. The combustor liner as claimed in claim 1, wherein the respective fixation member of each connection unit is placed in a respective gap formed between the respective first connection piece of the one panel of the pair of adjacent panels and the respective second connection piece of the other panel of the pair of adjacent panels.

* * * * *